United States Patent [19]

Yonkers

[11] 4,128,161
[45] Dec. 5, 1978

[54] VIBRATORY DEVICE

[76] Inventor: Edward H. Yonkers, 905 Westerfield Dr., Wilmette, Ill. 60091

[21] Appl. No.: 700,462

[22] Filed: Jun. 28, 1976

Related U.S. Application Data

[63] Continuation-in-part of Ser. No. 549,963, Feb. 14, 1975, abandoned.

[51] Int. Cl.² .............................................. B65G 27/32
[52] U.S. Cl. ....................................... 198/761; 209/368; 310/17; 310/28; 310/30
[58] Field of Search ............... 198/769, 761, 766, 757, 198/753; 209/368; 310/15, 17, 28, 21, 29, 30, 32, 33

[56] References Cited

U.S. PATENT DOCUMENTS

| 2,668,251 | 2/1954 | List | 310/28 |
| 2,733,360 | 1/1956 | List | 310/17 |
| 3,048,260 | 8/1962 | Willis | 198/761 X |
| 3,053,380 | 9/1962 | Sporlin | 198/761 X |
| 3,336,488 | 8/1967 | Scott | 310/30 |
| 3,655,032 | 4/1972 | Willis | 198/757 |
| 3,796,299 | 3/1974 | Musschoot | 198/753 |

FOREIGN PATENT DOCUMENTS 2219141  8/1973  Fed. Rep. of Germany ........... 198/766

Primary Examiner—Robert W. Saifer
Assistant Examiner—Douglas D. Watts
Attorney, Agent, or Firm—Mason, Kolehmainen, Rathburn & Wyss

[57] ABSTRACT

A vibratory feeder system includes a track having a linear, circular or helical configuration upon which articles that are to be transported are positioned. The vibratory feeder system further includes a support structure for supporting the track. The track and support structure are joined by resilient members of a configuration and dimension such that the track may move in a generally linear, reciprocative path relative to the support structure. The vibratory feeder further includes one or more self-contained, inertial drive elements wherein each drive element includes a rigid, nonmagnetic, cylindrical housing having end covers. Two iron stator cores are rigidly mounted within the housing and to the interior of one end cover thereof. Two resilient members having mounted at one end thereof a reciprocating armature are secured to the one end of the housing. A laminated iron armature core positioned so as to be spaced from the stator cores by an air gap is mounted on the armature. The stator cores upon being energized effectuate oscillatory movement of the armature. This reciprocating movement is transmitted to the housing of the inertial drive element. The inertial drive element is secured in a clamp that is rigidly attached to the track. The attachment of the inertial drive element to the clamp is such that the clamp may be loosened to allow rotational or longitudinal movement of the inertial drive element relative to the clamp and to the track. Consequently, the inertial forces imparted to the clamp are subsequently imparted to the track at a desired location and angle thereby causing a controlled oscillating movement of the track relative to the support.

20 Claims, 8 Drawing Figures

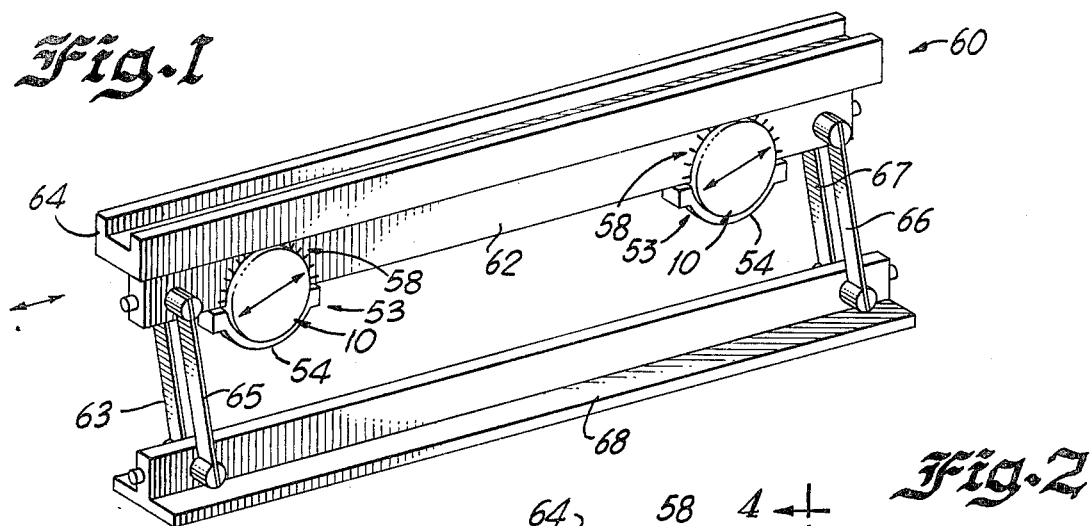
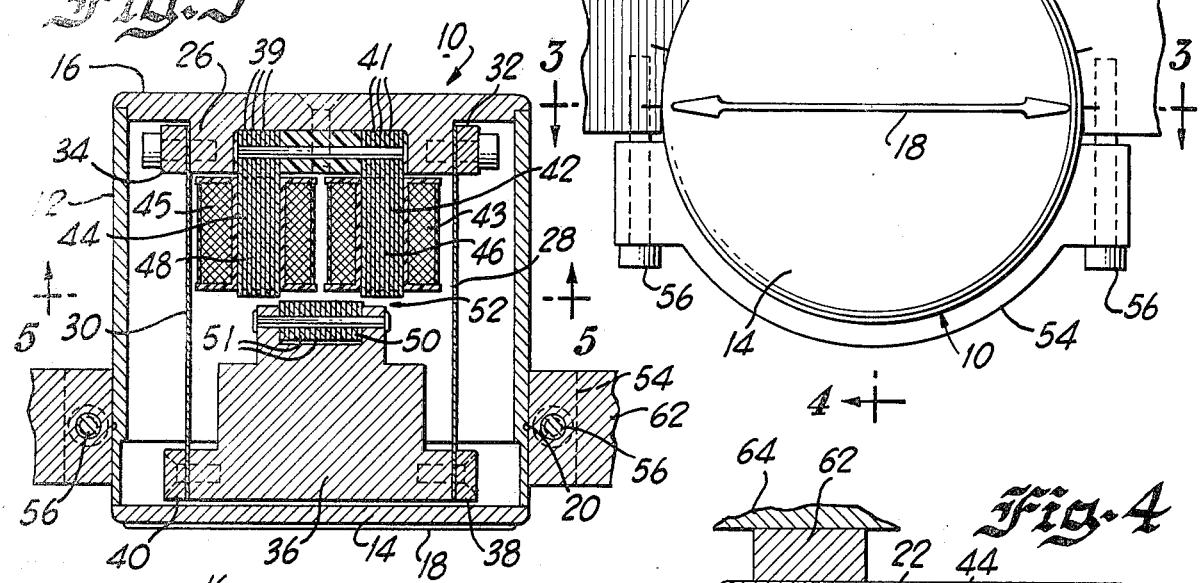
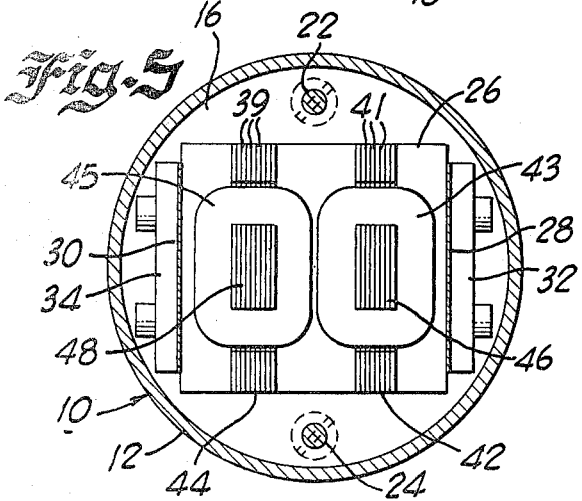
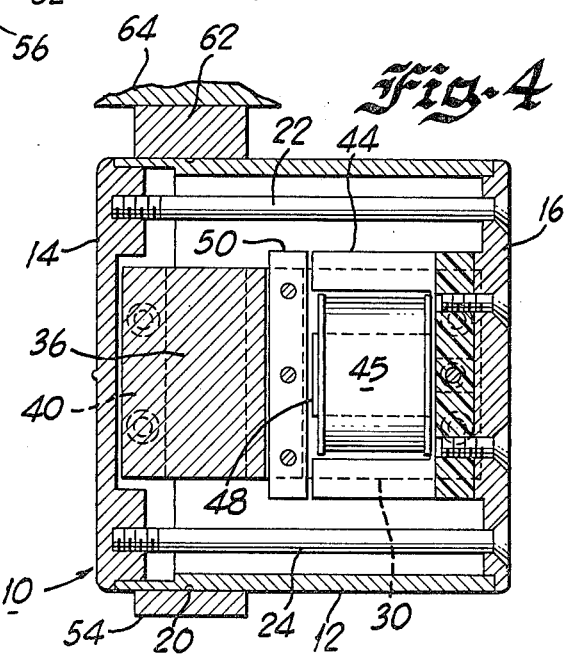

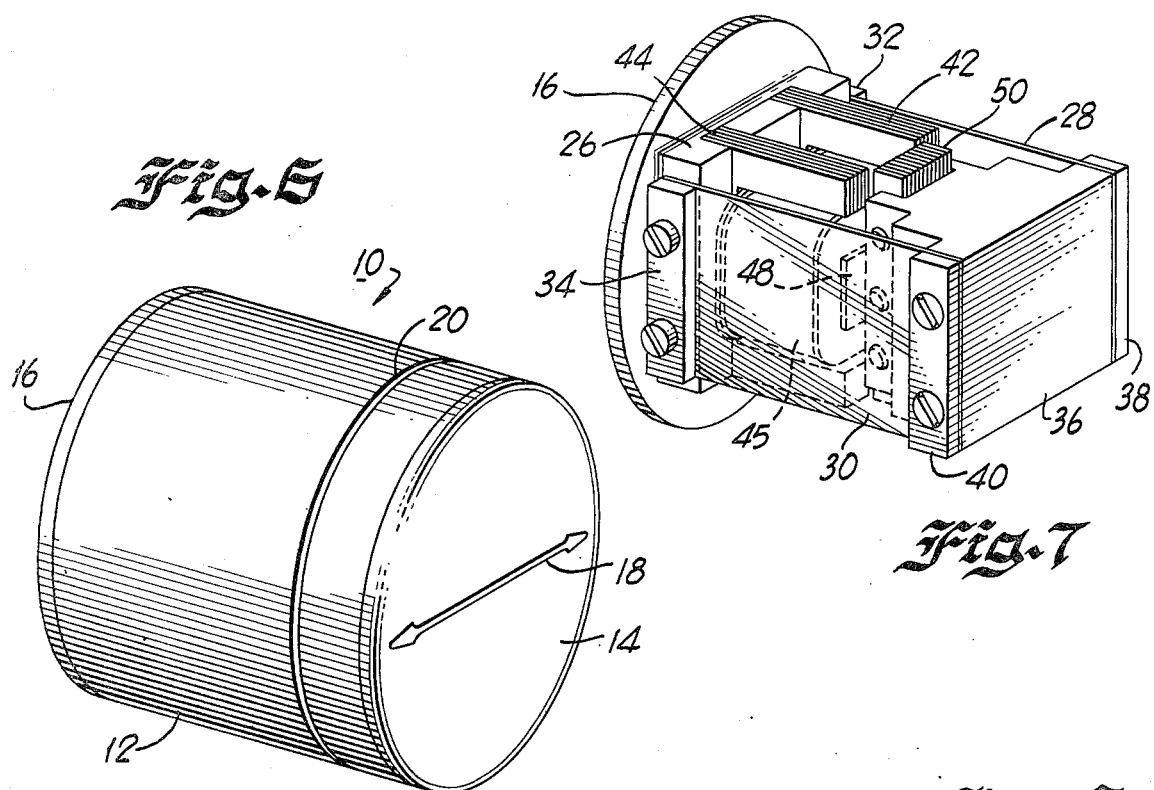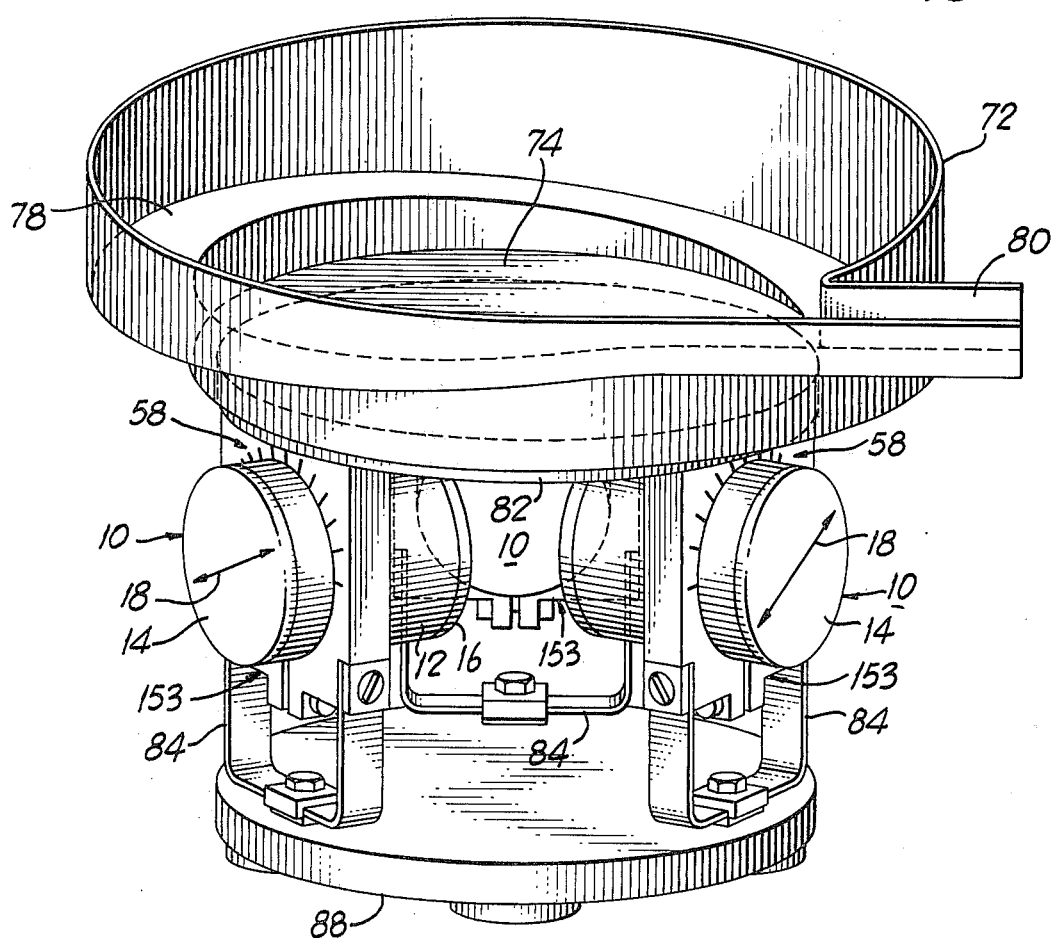

VIBRATORY DEVICE

CROSS-REFERENCE TO RELATED APPLICATIONS

This application is a continuation-in-part application of a prior filed copending application Ser. No. 549,963 filed by Edward H. Yonkers entitled "RECIPROCATING MOTOR" and filed on Feb. 14, 1975, and now abandoned, which is hereby incorporated herein by reference for all purposes.

BACKGROUND OF THE INVENTION

A. Field of the Invention

The present invention relates to improvements in vibration drivers for feeding and orienting parts of components into automatic assembly systems or similar uses.

B. Description of the Prior Art

In general, vibratory feeders employ a small amplitude vibration in the path or track along which parts travel. The direction of such vibrations, in order to be effective in advancing the parts along the track, must be at an appropriate angle with respect to the direction of the force of gravity acting on the parts. For example, with the vibration of the track set at 45 degrees, with respect to the direction of gravitational force (upward to the right and downward to the left), the parts in the track will move to the right. A change of 90° in the vibration angle causes the parts to move to the left along the track.

Progressive motion of the parts along the track may be explained as follows. On the rising part of the vibration cycle, the parts press against the track by the force of gravity plus the inertial force from the acceleration of the mass of the part. This tends to keep the parts moving with the track. However, on the descending half of the vibration cycle, the pressure of the parts against the track due to the gravitational force is reduced by the residual, upward momentum of the part already acquired and, in addition, the track is moving downward away from the part. Thus, the part has little or no force against the track during the downward portion of the vibration cycle. In effect, the track moves downward and under the parts then picks them up and advances them on the next upward half-cycle to the right or left depending upon the direction of the vibration angle.

Prior art vibratory parts feeders employ a track member having mass ($M_1$) and a relatively heavy base ($M_2$) generally 5 to 10 times the mass of the track member. The track member and base are coupled together by means of a plurality of angularly disposed, flat springs. Typically, an electromagnetic actuator is connected between the track and base so as to cause the track to move upward to the right and downward to the left or visa versa, as required.

If alternating current or current pluses at a definite frequency are applied to the actuator, the track and base will vibrate toward and away from each other at twice the frequency of the alternating current, or at the pluse frequency if D.C. pulses are used. Such a structure will exhibit mechanical resonance at a specific frequency determined by the mass of the track, the mass of the base and the effective rate of the spring system. This relation is expressed as follows:

$$n = \frac{1}{2\pi} \sqrt{K \frac{M_1 + M_2}{(M_1 M_2)}}$$

where:
n is the natural frequency of the system,
K equals the effective spring rate,
$M_1$ equals the mass of track,
$M_2$ equals the mass of the base.

The amplitude of vibration of each mass in such a two-mass system is inversely proportional to the mass. Thus, if the mass of the base is ten times the mass of the track, the amplitude of the track vibrations will be approximately ten times that of the base.

In practice, such vibration systems are applied to linear, circular or helical tracks. In the case of circular or helical tracks, for example the track element, is coupled to the relatively heavy base member by three or more flat springs arranged symmetrically around the periphery of the track at an appropriate angle with respect to the direction of the gravitational force. The electromagnetic drive element is arranged to deflect the system against the combined spring force. The motion of the track is necessarily helical, downward clockwise and upward counterclockwise or visa versa depending upon the angle of the mounting springs. The parts will proceed along the track in the direction of the upward half of the vibration cycle.

SUMMARY OF THE INVENTION

One of the purposes of the present invention is to provide individual, self-contained, inertial drive elements for application to devices wherein the vibration angle, moment of inertia and amplitude of each element may be readily adjusted to meet varying requirements.

Another purpose of the present invention is to provide a vibratory parts feeder that produces a substantially constant feed rate over a wide range of parts loading.

Another purpose of the present invention is to provide feeder systems which may be readily adjusted to meet variations in the vibration requirements along the path of the moving parts.

Moreover, a purpose of the present invention is to provide a feeder system of the type that the amplitude and direction of vibrations along the feeder path are relatively independent of the mass and rigidity of the base.

Similarly, a purpose of the present invention is to provide a parts feeder system which does not require a relatively high mass base (i.e., 5 to 10 times the mass of the feed track) as is required in prior art feeder systems.

The present invention provides separate, self-contained inertial drive elements that permit convenient control of the direction, amplitude, and frequency of the vibrations imparted to a track in a vibratory feeder system to meet the requirements of specific applications.

These elements consist of a spring-mounted oscillating armature freely oscillating within a rigid cylindrical housing. The center of mass of the armature is on the axis of the cylindrical housing when at-rest and moves along a diameter of the housing during operation. The end covers of the housing are clearly marked to show the exact direction of the motions of the oscillating armature. Moreover, the position of the center of mass of the oscillating armature along the axis of the cylinder is indicated by a circular groove on the outer surface of the cylindrical housing.

Each inertial drive element is mounted in a cylindrical clamping member so that the direction of the vibration and the position of the center of mass of the work armature can be readily adjusted. The inertial reaction arising from the oscillating armature is transmitted to the rigid housing and thence, to the mounting bracket and finally to the work system where controlled vibration is required.

One or more inertial drive elements may be connected to linear, circular or helical track systems providing convenient, independent adjustment of the oscillation angle and the position of the center of mass of the oscillating armature of each inertial drive element. Thus, the particular requirements encountered in specific applications may be readily met.

The present invention is also basically a "two mass" system and it behaves according to the same relationship:

$$n = \frac{1}{2\pi} \sqrt{K \frac{M_1 + M_2}{M_1 M_2}}$$

where:

n equals natural frequency of the system, K equals the effective spring rate, $M_1$ equals the mass of the oscillating armature, $M_2$ equals the total mass which is rigidly connected to the inertial drive housing and thus includes the track-mounting brackets and the inertial drive housing.

It should be noted that in this case the smaller mass ($M_1$) represents the oscillating armature which in practice is in the range of one-third to one-tenth the mass of the track system. Thus, the entire vibratory feeder system may weigh only twice the weight of the track, whereas conventional vibratory feeders weigh from six to twelve times the weight of the track.

In order for the relatively low mass of the oscillating armature in the inertial drive element to produce the desired inertial reaction force on the heavier track element, the amplitude of the oscillating armature movement must be relatively large. For example, a one pound armature could have a maximum amplitude of 0.3 inches. This would be capable of producing a 0.03 inches vibration amplitude in a ten pound track system, per inertial drive element attached to the system. This is more than adequate for moving the parts along the track.

With such excess drive capacity, the present system may be operated in an "off-resonance" zone wherein the added mass due to parts loading brings the system closer to resonance with the A.C. supply or forcing frequency. By controlling the significant parameters, the system can provide a substantially constant part feed-rate over a wide range of part loading.

BRIEF DESCRIPTION OF THE DRAWINGS

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the present invention may be employed.

In the annexed drawings:

FIG. 1 is a perspective view of the present invention mounted upon an elongated feed track;

FIG. 2 is an enlarged, elevational, fragmentary view of the device of the present invention rotated from the angle illustrated in FIG. 1;

FIG. 3 is a cross-sectional view of the device of the present invention taken along line 3—3 of FIG. 2;

FIG. 4 is a cross-sectional view of the device of the present invention along line 4—4 in FIG. 2;

FIG. 5 is a cross-sectional view of the device of the present invention taken along line 5—5 of FIG. 3;

FIG. 6 is an enlarged, perspective view of the device of the present invention;

FIG. 7 is a perspective view of the device of the present invention illustrated in FIG. 6 with one end and the cylindrical housing removed; and FIG. 8 is a perspective view of the device of the present invention mounted upon a helical track feeder.

DETAILED DESCRIPTION OF THE PREFERRED EMBODIMENT

With reference to the drawings, there is illustrated a new and improved inertial drive element 10 constructed in accordance with the principles of the present invention. The inertial drive element 10 may be attached to a device such as a vibratory feed system (FIG. 1) and thereafter energized to vibrate the track of the feeder system and transport objects along the track from one position to another.

The inertial drive device 10 includes a housing 12 fabricated from a rigid, nonmagnetic material such as, in a specific embodiment, aluminum. The housing 12 has a cylindrical configuration with end covers 14 and 16. On the exterior surface of each end cover 14 and 16 there may be indicia in the form of a diametric line or arrow 18, the purpose of which will be described hereinafter.

In addition, the exterior surface of the cylindrical housing 12 has a peripheral groove 20 (FIG. 6) whose function is also discussed hereinafter. Since the housing of the inertial drive element is subjected to substantial vibrational forces, the end covers 14 and 16 are rigidly secured together and to the housing 12 by bolts 22 and 24. In order to mount equal rectangular flat springs 28 and 30 to the housing, end cover 16 includes an integrally formed projection or base portion 26. Rectangular steel, flat springs 28 and 30 are rigidly secured at one end to the integral extension or base 26 by end clamping members 32 and 34. The flat springs 28 and 30 are substantially identical in dimension and clamp positions. To generate periodic inertial forces, an oscillating armature 36 is securely attached to the free ends of flat springs 28 and 30 by end clamping members 38 and 40. This constitutes a rectangular parallelepiped configuration which possesses a single degree of freedom so that the oscillating armature 36 is limited to movement along a substantially linear, reciprocative path, normal to the axis of the housing, with the center of mass of the armature moving along a diameter of the housing.

In accordance with an important feature of the present invention, a pair of laminated iron stator cores 42 and 44 which, in a specific embodiment, may be a standard "E" shaped laminae are positioned normal to the direction of linear oscillating movement of the mass 36 and mounted within the base portion of the end member 16. The stator cores 42 and 44 each include a plurality of planar, iron core laminae 39 and 41, respectively (FIG. 3), that are disposed substantially perpendicular to the reciprocative path of the oscillating armature 36. In carrying out the invention, exciter coils 43 and 45 are mounted about the center legs 46 and 48 of the stator cores 43 and 45, respectively. Upon energization, these coils 43 and 45 will induce a magnetic field in the stator cores 42 and 44.

In the preferred embodiment, the coils 43 and 45 may be connected in parallel through separate half-wave rectifiers to a source of alternating current of electricity. In this manner, coils 43 and 45 will be alternately energized; one coil, for example 43, on the positive half-cycle of the alternating current and the other coil, for example 44, on the negative half-cycle of alternating current. These alternating pulses will alternately create a magnetic field within each stator core 42 and 44 in an alternating fashion.

In accordance with another important feature of the present invention, a laminated iron armature core 50 is mounted to the oscillating armature 36. The oscillating armature 36 is mounted upon flat springs 28 and 30 in a manner such that the armature core 50 and the stator cores 42 and 44 are separated by a controlled air gap 52. The armature core 50 includes a plurality of planar laminations or laminae 51 disposed generally normal or perpendicular to the direction of motion or of the reciprocative path of the oscillating armature 36.

Upon the alternating energization of the exciter coils 43 and 45, magnetic flux is alternately generated in the stator cores 42 and 44. Due to the disposition of the armature laminae 51 and the stator laminae 39 and 41 substantially normal to the direction of motion of the oscillating armature 36, the magnetic force-displacement characteristics of the armature-stator system is extended and made more uniform. This desirable characteristic may be enhanced by increasing the non-magnetic gaps between all laminae in the core members.

Upon the energization of the coil 45, the oscillating armature 36 is deflected to the left along the path of reciprocation (FIG. 3) under the influence of the magnetic flux in the stator core 44. Movement of the vibrating armature 36 in the opposite direction is effected upon the de-energization of the coil 45, by the spring return forces of the deflected springs 28 and 30 and by the energization of the coil 43 on an alternate half-cycle to generate magnetic flux in the stator core 42. The reciprocative movement of the armature 36 occurs as a result of the magnetic force generated by the magnetic field existing across the air gap 52. The shape of the magnetic field changes with the displacement of the aramture laminae 51 relative to the stator laminae 39 or 41, causing progressive changes in the magnitude and direction of forces between the laminae 51, and 39 and 41.

When the armature core 50 is in its at-rest or undeflected position (FIG. 3), a large, transverse component of magnetic force in the direction of reciprocation parallel to the controlled air gap 52 is generated by the energization of one of the coils 43 or 45 to thereby deflect or move the armature core 50 and the armature 36 in the direction of the energized coil. As the deflection of the vibrating armature 36 increases, the transverse component of the magnetic force decreases and the vertical component of the magnetic force increases. The rectangular parallele piped of the armature-base spring system permits the movement of the armature 36 only along a substantially linear, transverse path of reciprocation (FIG. 3) in response to the transverse components of the magnetic force and prevents significant deflection of the armature 36 in a vertical direction in response to the vertical forces of the vertical components of the magnetic force. Thus, the armature 36 oscillates freely under the forces imposed by the magnetic field and the combined spring rate substantially without frictional losses in spite of the high magnetic forces normal to the direction of oscillation.

Turning now to FIGS. 1 and 2, there is illustrated a pair of inertial drive elements 10 securely mounted in clamp assemblies 53. Each clamp assembly 53 has a lower U-shaped portion 54 removably secured to the upper portion of the clamp assembly 53 by identical fasteners 56. In this manner, the fasteners 56 may be loosened thereby loosening the U-shaped portion 54. The inertial drive element 10 may then be rotated about its longitudinal axis or moved in a longitudinal direction within the clamp assembly 53.

The upper portion of clamp assembly 53 includes indicia indicating a degrees scale 58. The angular direction of movement of the oscillating armature 36 relative to the clamp assembly 53 may be indicated using the scale 58 and the line or arrow 18. Arrow 18 lies along the direction of oscillation of the armature 36 within the housing 12 of the inertial drive element 10. By loosening fasteners 56 the inertial drive element 10 may be rotated within the clamp assembly 53. The arrow 18 points to the indicia 58 indicating the angle with respect to the clamp member 52 along which the vibrating armature 36 oscillates.

In addition, the inertial drive element 10 may be moved along its logitudinal axis varying the location of the peripheral groove 20 with respect to the clamp assembly 53. The peripheral groove 20 indicates the location of the center of mass of the oscillations armature 36. In this manner, the exact position of the center of mass of the oscillating armature 36 may be adjusted relative to the clamp assembly 53 such that the point of impartation of the inertial forces generated by the oscillating armature 36 may be varied.

In operation, the inertial drive element 10 may be secured by the lower clamping member 54 to a U-shaped parts track assembly indicated generally as 60 (FIG. 1). The inertial drive element 10 may be secured to a vertical mounting panel 62 of the parts track 60 by the U-shaped clamp 54. There may be included indicia 58 on the vertical mounting panel 62. Upon the upper surface of the vertical mounting panel 60, is attached a track 64.

Additionally, secured to the mounting plate 62 are rectangular, flat springs 63, 65, 66 and 67. The springs 63, 65, 66 and 67 are each secured at the opposite end to a support or base member 68. The springs 63, 65, 66 and 67 may, in a preferred embodiment, be rectangular, flat, steel springs connected to the support panel 62 and the base 68 in a manner such that the track 62 moves in only a preferred direction controlled by the position of the inertial drive elements 10 as indicated by their direction arrows in FIG. 1.

The individual inertial drive elements 10 may be rotated within the clamps 54 to the desired angle of oscillation of the vibrating armature 36. In addition, the elements 10 may be moved longitudinally to position the center of mass of the vibrating armature 36 in the preferred position relative to the track 64 such that the force imparted to the track 64 is at the desired location. Thereafter, the clamps 54 are tightened securing the inertial drive elements 10 in the preferred position.

In this configuration, part enter from the left as viewed in FIG. 1 and are transported under the influence of the vibratory forces imparted by the individual inertial drive elements 10 along the track 64 to the right as viewed in FIG. 1.

Turning now to FIG. 8 wherein identical reference numerals indicate elements identical to previously described, similarly numbered, elements there is illustrated a further embodiment of the present invention. A circular bowl 72 having a central reservoir 74 into which parts may be positioned for separation and transportation is illustrated. In this embodiment, parts are uniformly transported up the helical track 78 fabricated on the interior, peripheral sides of the bowl 72 emerging at the top 80 of the bowl 72 whereupon the parts may be collected for other uses.

To generate the necessary vibratory action to transport parts along the ramp or track 78, individual inertial drive elements 10 are secured to the support plate 82 of the bowl 72 by clamp assemblies 153. A plurality of resilient, U-shaped, flat springs 84 are secured to the bottom of the clamp assemblies 53. The individual springs 84 are subsequently attached to a base member 88. The springs 84 are of a configuration and are attached to the individual inertial drive elements 10 and to the base 88 in a manner such that the bowl 72 and, consequently, the helical ramp or track 78 oscillates in the desired direction but motion in other directions is restricted.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method of adjusting the direction of vibrations imparted to a track along which item move under the influence of said vibrations comprising the steps of
   attaching said track resiliently to a support structure in a manner such that said track may move in a generally planar, reciprocative path,
   attaching a clamp rigidly to said track wherein said clamp movably secures a self-contained inertial drive system having a cylindrical housing, an internal oscillating armature that, upon being energized, moves along a path substantially along a diameter of said housing,
   rotating said inertial drive system within said clamp such that the diametric movement of said armature is angularly varied with respect to the direction of the gravitational force acting on said items, and
   securing said inertial drive system rigidly to said track by said clamp upon positioning the movement of said armature at the desired angle relative to said gravitational force.

2. A method of adjusting the location of vibrational force impartation to a track along which items move under the influence of said force comprising the steps of
   attaching said track resiliently to a support structure,
   attaching a clamp rigidly to said track wherein said clamp movably secures a self-contained inertial drive system including a cylindrical housing and an internal oscillating armature that, upon being energized, moves along a diameter of said housing.
   moving said inertial drive system in a longitudinal direction with respect to said cylindrical housing within said clamp thereby moving the center of mass of said armature relative to the planar surface defined by said track, and
   securing said inertial drive system to said clamp upon positioning said system at the desired location.

3. A method of moving articles along a track comprising the steps of
   mounting said track resiliently to a support structure such that said track moves in a generally, planar, reciprocative path relative to said support structure,
   attaching a clamp rigidly to said track,
   securing within said clamp a self-contained inertial drive system including an internal oscillating armature such that said inertial drive suplem may be rotated or moved longitudinally within said clamp to a desired orientation and rigidly secured within said clamp at said orientation, and
   energizing said system such that the internal reaction arising from said inertial drive system is transmitted to the rigid clamp and thence to said track wherein said track vibrates relative to said support thereby moving said articles positioned upon said track.

4. In combination
   guide means for defining the path of travel of objects positioned upon said guide means,
   support means for resiliently supporting said guide means for movement of said guide means relative to said support means along a generally, planar reciprocative path,
   a self-contained inertial drive system including a housing defining a hollow, cylindrical configuration having two ends,
   an armature,
   resilient means for mounting said armature within said housing, said armature supported for movement along a generally, linear reciprocative path, said armature being located on an axis of said cylindrical housing, said generally linear reciprocative path being directed along a diameter of an end of said cylindrical housing, and
   means for moving said armature along said generally linear reciprocative path, and
   means for rigidly mounting said self-contained inertial drive system to said guide means to thereby transmit the vibrations resulting from the reciprocative movement of said armature through said housing to said guide means, said inertial drive system mounting means further comprising means for angularly adjusting the mounted position of said cylindrical housing relative to said guide means thereby angularly adjusting said armature path relative to said guide means.

5. The combination set forth in claim 4 wherein said inertial drive system further comprises means for indicating the direction of the reciprocative path relative to said guide means.

6. The combination set forth in claim 5 wherein said indicating means comprises indicia located along the diameter of one of said ends of said cylindrical housing aligned with said reciprocative armature path and reference indicia being located on said guide means and adjacent said inertial drive system when mounted to said guide means.

7. The combination set forth in claim 4 wherein said inertial drive system mounting means further comprises means for varying the location of the center of mass of said inertial drive system relative to said guide means.

8. The combination set forth in claim 4 wherein said supporting means for said guide means comprises a base member and at least one resilient member attached between said base member and said guide means.

9. The combination set forth in claim 4 wherein said guide means comprises a linear track.

10. The combination set forth in claim 4 wherein said guide means comprises a circular bowl having a gradually rising helical track.

11. The combination set forth in claim 4 wherein said armature moving means comprises a plurality of laminated stator cores securely fixed to said inertial drive system housing and a laminated armature core secured to said armature.

12. The combination set forth in claim 11 wherein said laminated stator core and said laminated armature core each include a plurality of laminae disposed generally, perpendicular to the direction of said reciprocative path.

13. The combination set forth in claim 12 wherein said armature core comprises substantially non-magnetic means for physically separating and spacing adjacent laminae of said plurality of laminae to form substantially non-magnetic gaps between said adjacent laminae.

14. The combination set forth in claim 13 wherein said adjacent laminae are planar laminae and wherein said non-magnetic separating means comprises non-magnetic coatings on both planar sides of each one of said planar laminae such that the total thickness of said coating is approximately 20 percent of the thickness of each one of said planar laminae.

15. The combination set forth in claim 13 wherein the thickness of said non-magnetic gaps between first portions of said plurality of laminae are subtantially greater than the thicknesses of said non-magnetic gaps between second portions of said plurality of laminae.

16. The combinations set forth in claim 13 wherein the thickness of at least a plurality of said non-magnetic gaps are unequal and generally increase as the distance from their associated adjacent laminae increase from one end of said armature core.

17. The combination set forth in claim 11 further comprising
 a source of alternating current power and
 a plurality of exciter or field coils electrically connected to said power source for generating magnetic flux in said stator cores upon excitation by said power source.

18. The combination set forth in claim 17 further comprising a plurality of half-wave rectifiers serially connected between said power source and said exciter coils to pass alternate half-cycles from said power source to said exciter coils.

19. The combination set forth in claim 11 wherein said stator cores and said armature core are vertically spaced by an air gap of a predetermined dimension.

20. The combination set forth in claim 4 wherein said resilient armature mounting means comprises a plurality of resilient springs having substantially identical dimensions, said springs being attached to said housing.

* * * * *

UNITED STATES PATENT OFFICE
CERTIFICATE OF CORRECTION

Patent No. 4,128,161   Dated December 5, 1978

Inventor(s) Edward H. Yonkers

It is certified that error appears in the above-identified patent and that said Letters Patent are hereby corrected as shown below:

Claim 1, column 7, line 37, change "item" to --items--;

Claim 2, column 8, line 14, change "suplem" to --system--; and

Claim 16, column 10, line 9, change "thickness" to

--thicknesses--.

Signed and Sealed this

Sixth Day of March 1979

[SEAL]

Attest:

RUTH C. MASON
Attesting Officer

DONALD W. BANNER
Commissioner of Patents and Trademarks